Dec. 26, 1922.

F. N. PETTEGREW.
DRIVE FOR MOTOR VEHICLES.
FILED DEC. 20, 1921.

Inventor,
F. N. Pettegrew
By
Attorneys

Dec. 26, 1922.

F. N. PETTEGREW.
DRIVE FOR MOTOR VEHICLES.
FILED DEC. 20, 1921.

Inventor,
F. N. Pettegrew
By CA Snow & Co.
Attorneys.

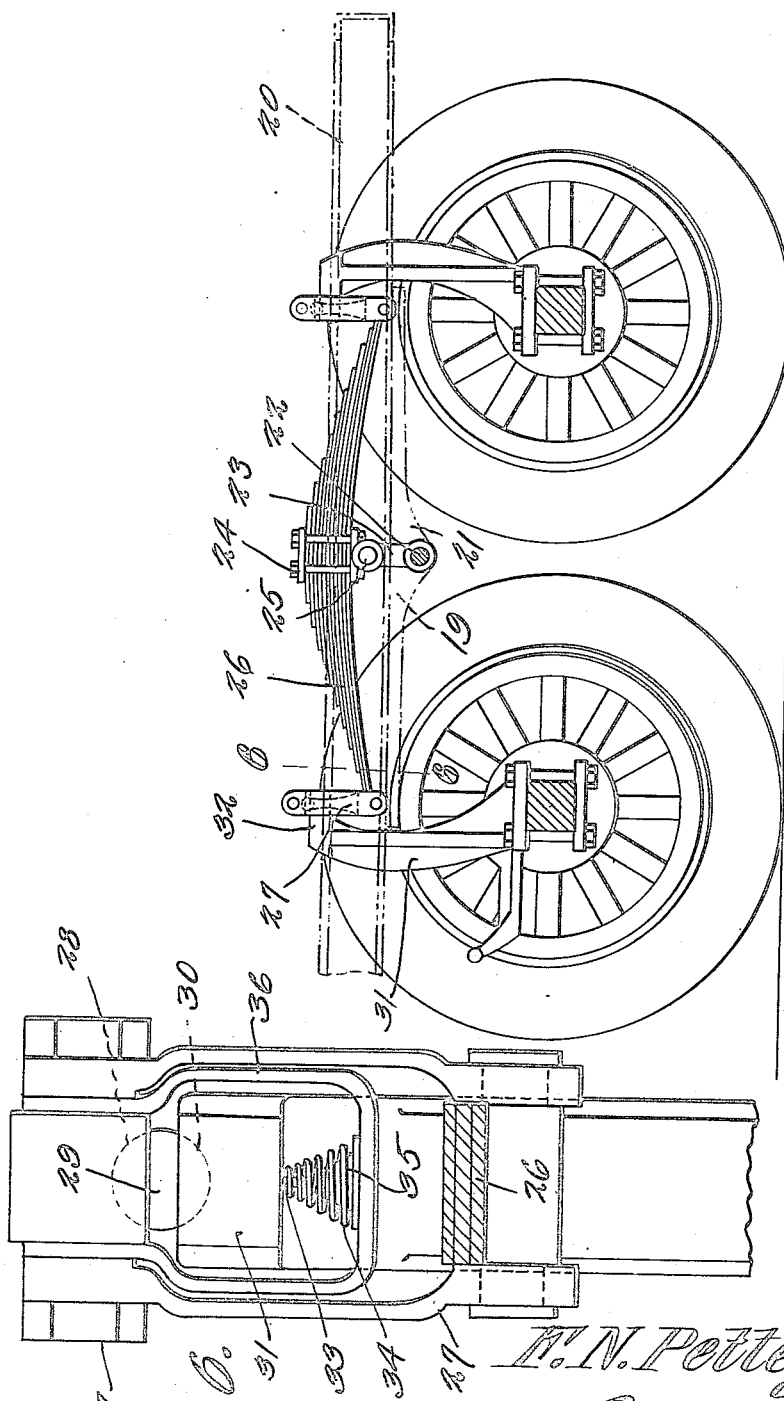

Dec. 26, 1922.
F. N. PETTEGREW.
DRIVE FOR MOTOR VEHICLES.
FILED DEC. 20, 1921.
1,440,239.
7 SHEETS—SHEET 5.
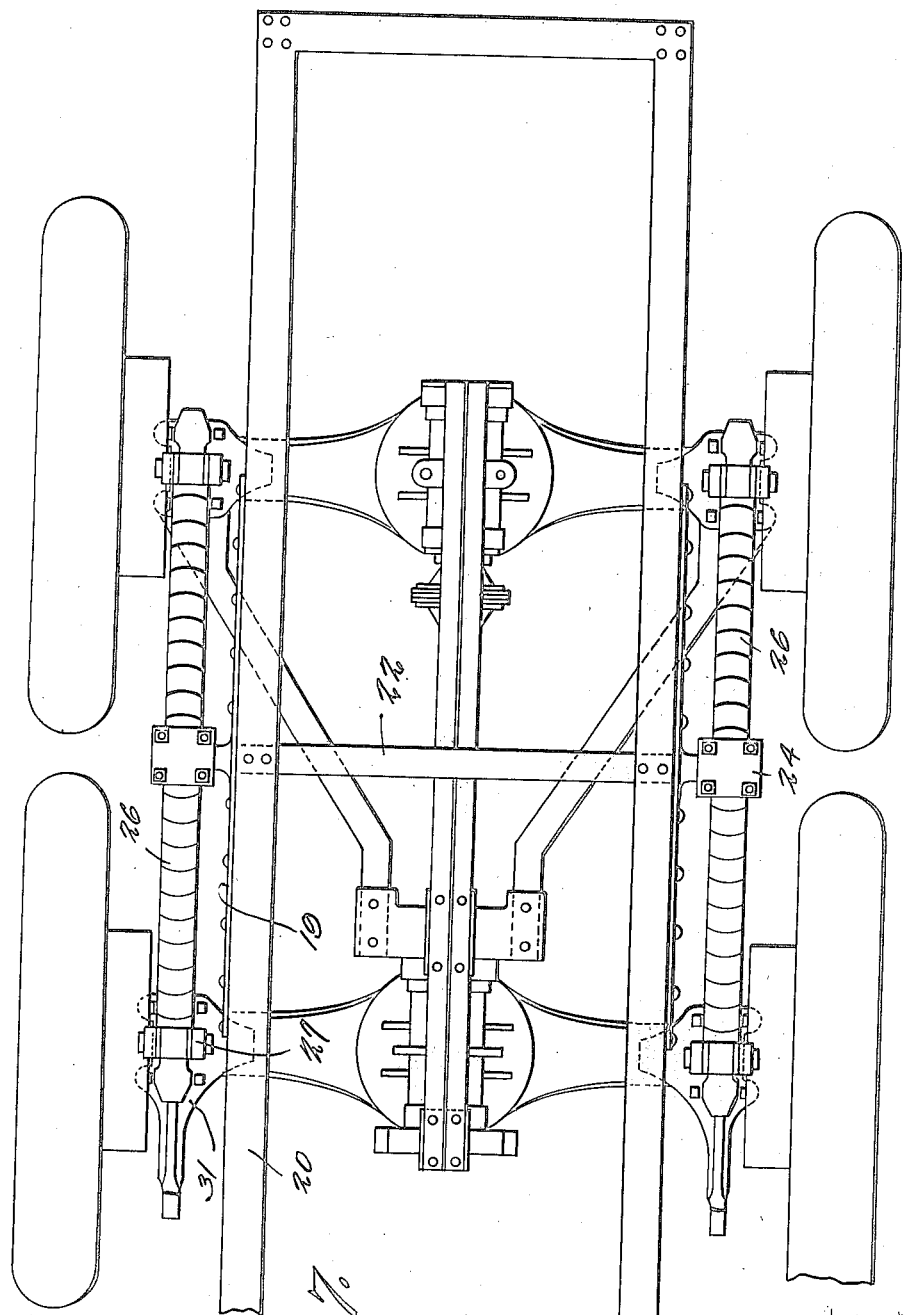

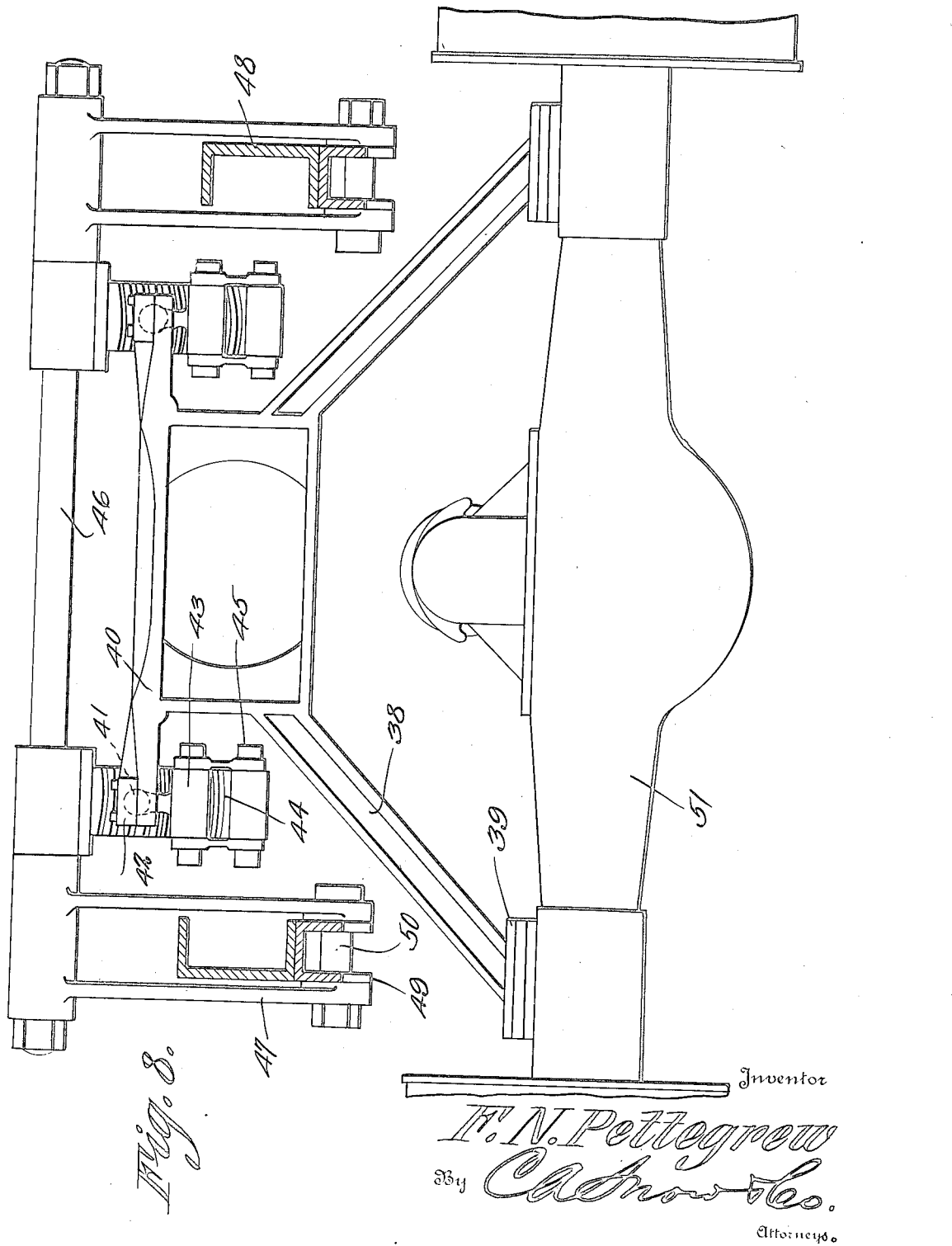

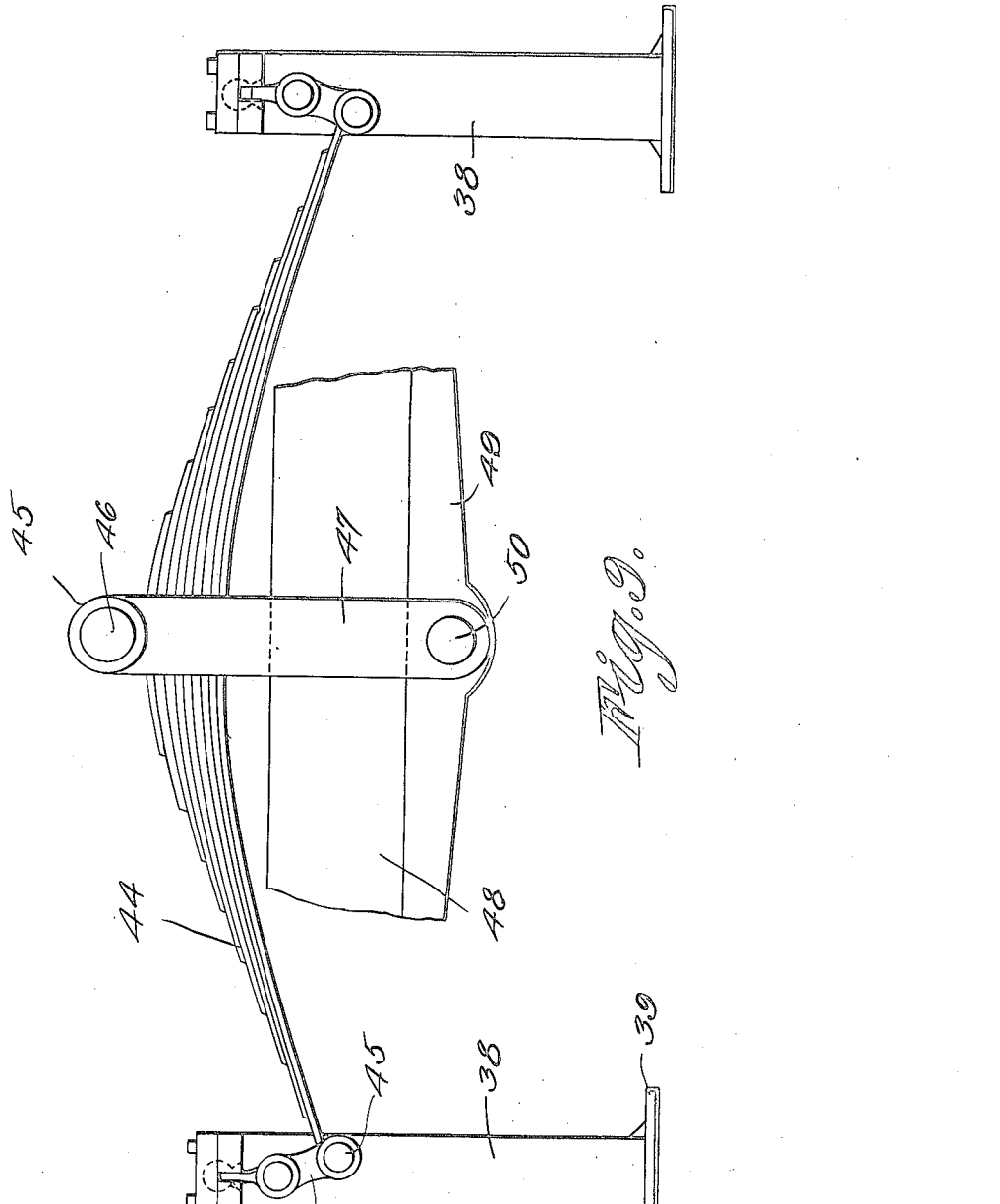

Patented Dec. 26, 1922.

1,440,239

UNITED STATES PATENT OFFICE.

FRED N. PETTEGREW, OF FOX LAKE, WISCONSIN.

DRIVE FOR MOTOR VEHICLES.

Application filed December 20, 1921. Serial No. 523,675.

*To all whom it may concern:*

Be it known that I, FRED N. PETTEGREW, a citizen of the United States, residing at Fox Lake, in the county of Dodge and State of Wisconsin, have invented a new and useful Drive for Motor Vehicles, of which the following is a specification.

This invention relates to truck construction, and more particularly to the construction of the running gear employed in connection with the drive wheels thereof.

The primary object of the invention is to provide novel means for connecting the drive wheels to the chassis of the truck, whereby the load of the truck will be equally distributed throughout the several driving wheels of the truck.

A further object of the invention is to provide means for compensating for the movement of one axle of the driving wheels with respect to the other axle thereof, when the wheels are passing over irregularities in a road surface.

A still further object of the invention is the provision of a novel arrangement of springs, and supports, to insure the body of the truck being maintained in a level position, when the truck is moving over irregular surfaces.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 5 is a side elevational view of a modified form of the invention.

Figure 6 is a sectional view taken on line 6—6 of Figure 5.

Figure 7 is a plan view of the modified form of the invention.

Figure 8 is an end elevational view of a modification.

Figure 9 is an enlarged detail view of the same.

Figure 1:
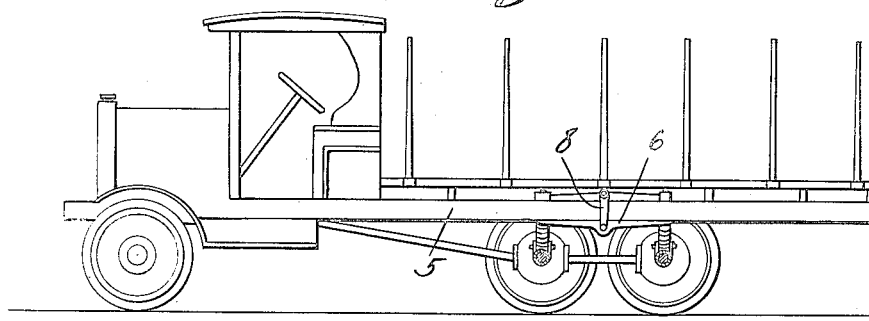
Figure 1 is a side elevational view of a four wheel drive truck constructed in accordance with the present invention.
Figure 2:
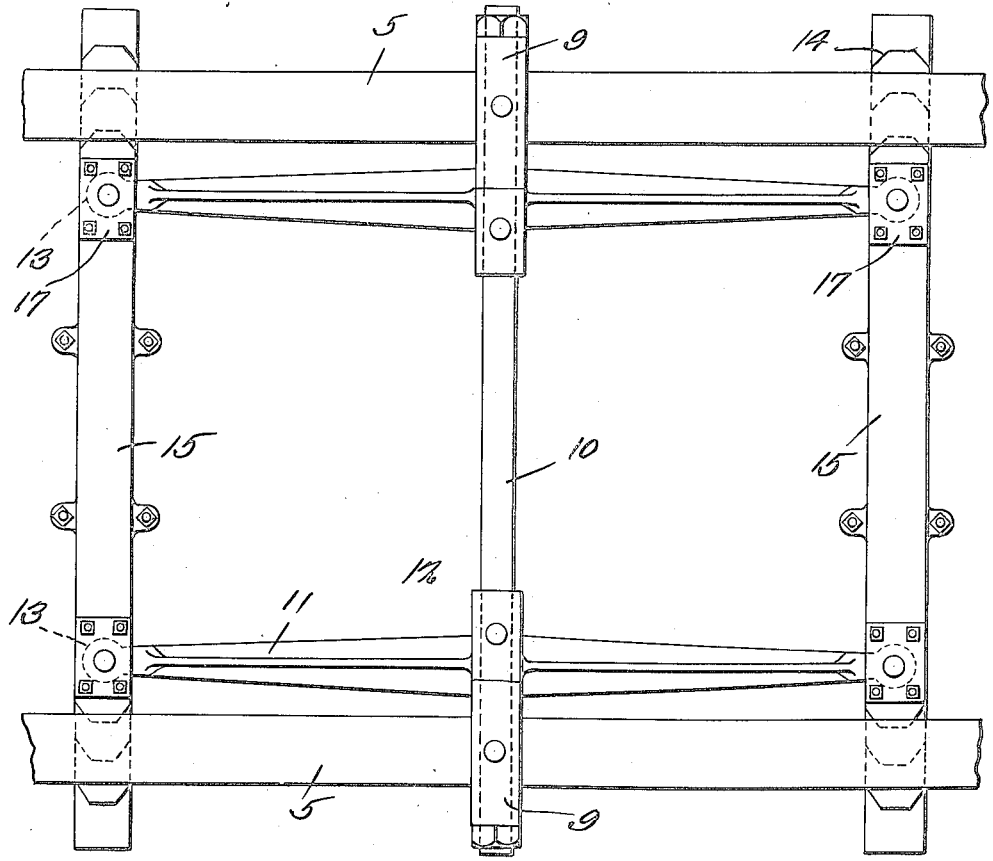
Figure 2 is a plan view of the structure which connects the drive wheels to the chassis of the truck.
Figure 3:
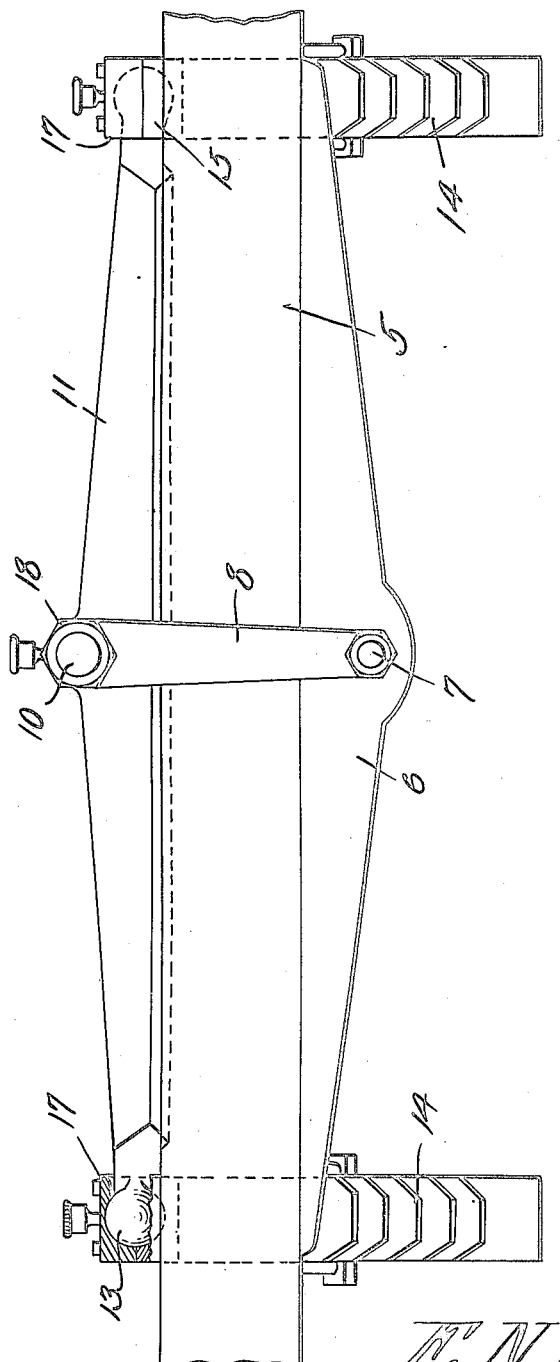
Figure 3 is a side elevational view of the same.

Referring to the drawings in detail, the reference character 5 designates the side rails of the chassis of a motor vehicle, the vehicle in the present showing being in the form of a truck.

Figure 4:
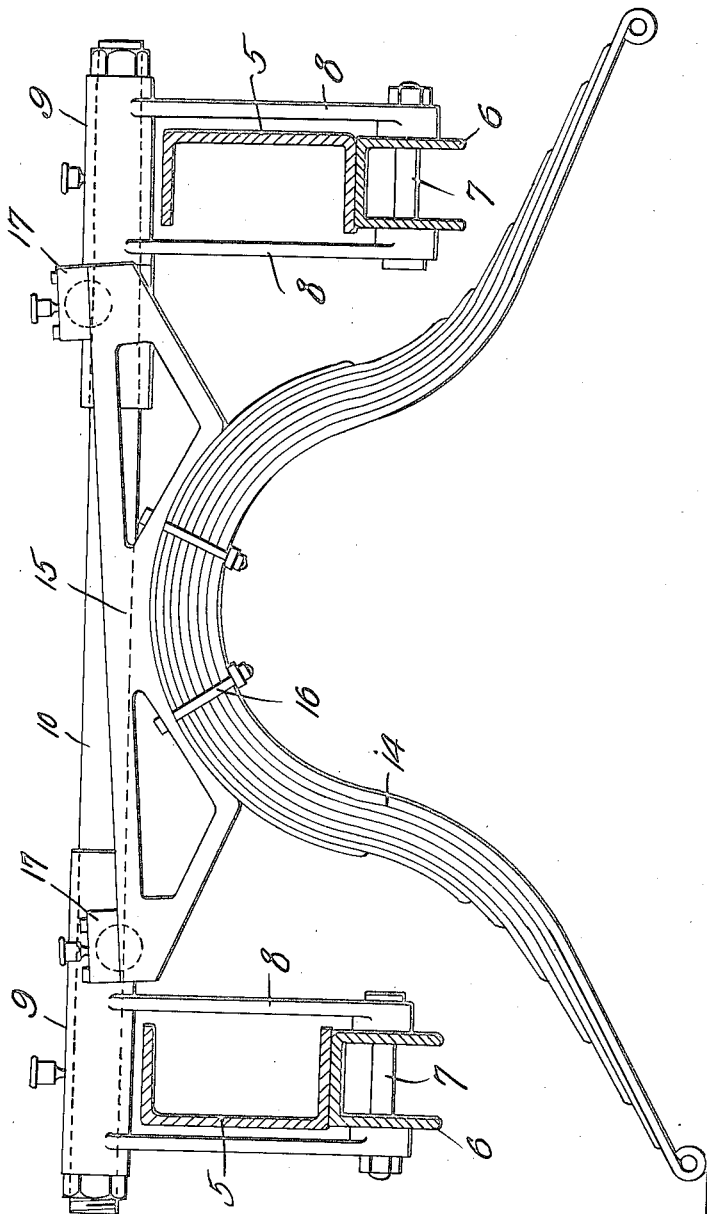
Figure 4 is a rear elevational view thereof.

The invention embodies a novel form of spring construction, which includes relatively long supports 6 having connection with the side rails of the chassis of the truck, the same being shown more clearly by Figure 4 of the drawings, as contacting with the lower edges of the side rails 5, and extending the entire distance between the springs of the device, the supports being provided with central openings to accommodate the bolts 7 which connect the depending arms 8 to the support 6, in a manner to permit of pivotal movement between the support and arms 8.

These arms 8 are disposed on opposite sides of the rail 5 associated therewith, and are formed integral with the sleeves 9 which are mounted on the main shaft 10 and secured thereto as by means of the nuts 18. The shaft 10 extends transversely of the frame at a point intermediate the springs and provides a support for the rocker arms 11, which have central bearing members 12 supported on the main shaft 10, the ends of the rocker arms being formed into balls 13.

The spring members 14 have connection with the rocker arms 11 through the saddles 15 which are cut away to accommodate the central curved portions of the springs, the saddles being connected to the springs 14, as by means of the U-bolts 16. Associated with the balls 13 of the rocker arms are the socket members 17 formed at the ends of the saddles 15, which receive the balls 13, the connections formed by the ball and socket joints being such as will permit of movement between the ends of the rocker arms and the saddles 15.

The spring members 14 may have connection with the drive axles of the vehicle, in any suitable manner so that rocking movement of the drive axles will cause a relative movement of the springs and the spring yokes and rocker arms. As illustrated by Figure 4 of the drawings, it will be seen that one portion of the spring has been elevated, with the result that one end of the saddle 15 is raised, while the opposite end thereof pivots downwardly, thereby compensating for the elevation at one end of the spring and permitting both wheels on the drive axle which has connection with the spring to operate with the tread portion thereof in proper relation with the ground surface.

In the modified form of the invention as disclosed by Sheets 4, 5, 6 and 7 of the drawings, the saddle is indicated by the reference character 19 and contacts with the under surface of the side rail 20. The intermediate portion of the saddle is enlarged as at 21 and is formed with an opening to accommodate the shaft 22 of the shackle 23, which has connection with the spring support 24, as by means of the bolt 25, whereby movement of the spring with respect to the saddle 21 is permitted.

26 designates the spring, which has its ends mounted in the pivoted carriers 27, that are formed with sockets 28 to accommodate the balls 29 which are positioned in recesses 30 of the bracket members 31 that connect with the axles of the vehicle.

The bracket members are formed with laterally extending portions 32 and have extensions 33 providing seats for the coiled springs 34 that are positioned over the extensions 35 formed on the stirrups 36, that are also pivotally supported by the bolt 37 that connects the spring carriers and stirrups. Thus it will be seen that movement of the brackets with respect to the spring supports is permitted. With reference to Figures 8 and 9, the vehicle frame support indicated at 38 is shown as secured to an axle housing, as at 39, the upper portion of the support being formed with a transverse bar 40.

The transverse bar 40 is formed with sockets 41 at the opposite ends thereof, which sockets receive the heads 42 of the shackles 43 which have connection with the spring members 44, as by means of the bolt 45. The spring members 44 have connection with the bearing members 45, intermediate the ends thereof, which bearing members are mounted on the transversely extending shaft 46.

Supported on the shaft 46 adjacent to the outer ends thereof are the stirrups 47 which lie in planes on opposite sides of the side rails 48 associated therewith. Supported by each of the stirrups 47 is a relatively long saddle 49 which has connection with its stirrup as by means of the bolt 50 passing therethrough. From the foregoing it will be seen that the axle housing which is indicated at 51 may move, with respect to the spring members, that is to say one end of the axle housing may move vertically with respect to the opposite end thereof, the movement being compensated for by the spring construction, in a manner to permit the chassis of the vehicle to remain in a true horizontal position.

While I have shown and described my invention as applied to motor trucks, it is to be understood that the same may be used in connection with trailers or the like.

Having thus described the invention, what is claimed as new is:—

1. In combination with the side rails of the chassis of a motor vehicle, a main shaft supported by the side rails, rocker arms mounted on the shaft, spring saddles having pivotal connection with the rocker arms, spring members secured to the saddle members, and said spring members adapted to be connected to the axles of a vehicle.

2. In combination with the chassis and four wheel drive of a motor vehicle, a main shaft, rocker arms mounted to rock on the main shaft, spring members extending transversely of the chassis, said rocker arms having connection with each of the spring members adjacent to the ends thereof, and means for connecting the rocker arms to the spring members to permit of movement of one spring member independently of the other.

3. In combination with the chassis and four wheel drive of a motor vehicle, a supporting shaft, rocker arms pivotally mounted on the supporting shaft, spring members supported under the chassis, each of said spring members having sockets, said rocker arms having balls formed on the ends therof, said balls being fitted in the sockets to permit of movement of the rocker arms with respect to the spring members, and drive axles having connection with the spring members.

In testimony that I claim the foregoing as my own, I have hereto affixed my signature in the presence of two witnesses.

FRED N. PETTEGREW.

Witnesses:
J. W. HOBKIRK,
H. H. KIRKPATRICK.